United States Patent [19]
Stauffer

[11] Patent Number: 5,512,144
[45] Date of Patent: * Apr. 30, 1996

[54] PULSE METHOD FOR SULFUR DIOXIDE ELECTROLYSIS

[75] Inventor: John E. Stauffer, 6 Pecksland Rd., Greenwich, Conn. 06831

[73] Assignee: John E. Stauffer, Greenwich, Conn.

[*] Notice: The portion of the term of this patent subsequent to Sep. 6, 2011, has been disclaimed.

[21] Appl. No.: 412,255

[22] Filed: Mar. 28, 1995

[51] Int. Cl.$^6$ ............................................. C25B 1/00
[52] U.S. Cl. .................. 205/554; 204/130; 204/242; 204/272; 205/763
[58] Field of Search .................................. 204/104, 129, 204/130, 242, 272, 101

[56] References Cited

U.S. PATENT DOCUMENTS

| | | |
|---|---|---|
| 3,655,547 | 4/1972 | Lyons, Jr. ............................ 204/248 |
| 4,830,718 | 5/1989 | Stauffer ............................... 204/104 |
| 5,344,529 | 9/1994 | Stauffer ............................... 204/101 |

Primary Examiner—Arun S. Phasge
Attorney, Agent, or Firm—Young, MacFarlane & Wood

[57] ABSTRACT

A process is provided for removing sulfur dioxide ($SO_2$) from a waste gas stream by electrolysis using a pulsed electric current and recovering the sulfur values as sulfuric acid. The sources of the waste gas stream include effluent vent, flue or exhaust gases from power plants, sulfuric acid plants, ore roasters, and solid waste incnierators. The purpose of the process is to achieve economies of operation, provide a useful byproduct, and minimize environmental pollution.

5 Claims, 1 Drawing Sheet 5,512,144

PULSE METHOD FOR SULFUR DIOXIDE ELECTROLYSIS

FIELD OF INVENTION

An electrolytic process is provided for removing sulfur dioxide ($SO_2$) from waste gas streams and recoverying the sulfur values as sulfuric acid. An improved feature of the process is the method of electrolysis by which sulfur dioxide is converted to sulfuric acid. The process is applicable to the treatment of waste gas streams from a number of sources including power plants, sulfur recovery units, sulfuric acid plants, ore roasters, and solid waste incinerators. The objective of the process is to improve electrical efficiencies and to reduce operating costs compared with existing technology.

BACKGROUND OF THE INVENTION

A process for the removal of sulfur dioxide from waste gases and recovery of the sulfur values as sulfuric acid is disclosed in U.S. Pat. No. 5,344,529. This patent describes a bipolar process in which an effluent vent or flue gas containing sulfur dioxide is scrubbed with an aqueous acid stream in an absorption column. The column contains an electrically conductive packing material that serves both as the gas-liquid contact surface and as the electrochemically active surface of a bipolar electrode. Thus, the sulfur dioxide is simultaneously absorbed in the acid and the dissolved sulfur dioxide is subjected to electrolysis. Byproduct sulfuric acid produced by the process is continually withdrawn from the system.

Electrical energy required for electrolysis in the bipolar process is supplied in the form of a direct current. This current, if obtained from a power grid, must first be stepped down to the necessary voltage and then rectified. A substantial investment is required in the electrical equipment to accomplish this task. Even if the process is used to scrub the flue gases from a power plant, the need for direct current is an additional cost.

Besides being concerned with the adjustment and regulation of the electrical power supply, the operator must face certain inherent inefficiencies in the bipolar process. The theoretical potential required for the electrolytic reaction is 0.2 volts. In practice, however, a minimum of 0.6 volts is needed before any reaction is obtained. This excess voltage, which is necessary, is attributed to electrode polarization caused by the irreversibility of the reactions.

The cost of electrical power consumed by the bipolar process is not inconsequential. As a result, any opportunity to reduce such cost is noteworthy. Even if the ideal case cannot be achieved, a significant improvement would greatly enhance the attractiveness of the process. Improved electrical efficiency would not only save expenses with regard to the direct power cost, but it also promises to increase the capacity of an installed scrubbing unit. Given the same electrode area, additional sulfur dioxide could be oxidized to sulfuric acid.

Therefore, it is an object of the present invention to provide a process which overcomes, or at least minimizes, the disadvantages of existing methods for removing sulfur dioxide from waste gases. It is an object to reduce electrical power consumption, to minimize the investment in electrical equipment, and to maximize the capacity of the process to remove sulfur dioxide.

These and other objects, features and advantages of the invention will become apparent from the following description and the accompanying drawings, FIGS. 1 and 2.

BRIEF SUMMARY OF THE INVENTION

A process is provided for the mitigation and control of air pollution caused by the emission of sulfur dioxide in effluent vent, flue or exhaust gas, said process comprising the removal of sulfur dioxide from a stream of such gas by scrubbing the gas in a column with aqueous sulfuric acid to solubilize and remove sulfur dioxide from the gas, said column containing electrically conductive packing material which serves both as a gas-liquid contact surface for scrubbing and as the electrochemically active surface of a bipolar electrode, and two electrical contacts arranged so that the bed of packing material is spaced between the contacts and is in electrical contact with said contacts; applying a pulsed electrical potential across said two contacts in excess of about 0.2 volts in order to effect electrolysis; and maintaining the concentration of the aqueous sulfuric acid by means of make-up water or acid. Instead of passing a liquid electrolyte through the bed so that the particles are completely immersed, the flue or vent gas containing the sulfur dioxide flows through the bed. The solid particles or bodies are wetted by a film of acid which is sprayed or otherwise distributed on the particulate bed. Thus, most of the void space is filled by the gas stream.

BRIEF DESCRIPTION OF THE DRAWINGS

The invention will be better understood by reference to the preferred embodiments illustrated in the accompanying drawings.

DETAILED DESCRIPTION OF THE PROCESS

Figure 1:
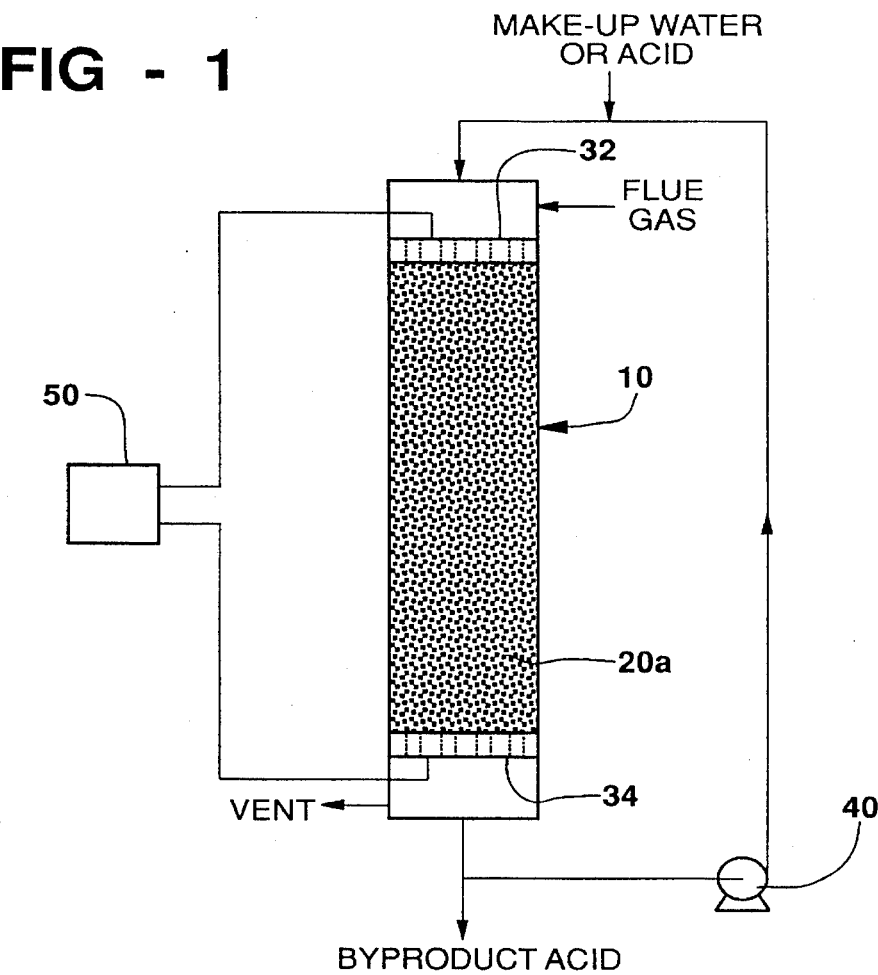
FIG. 1 is a diagrammatic view of the scrubber/electrolyzer in which the packing material serves both as the contact surface for scrubbing and as the bipolar electrode. A pump is provided to circulate acid through the scrubber. The electrical power supply is shown schematically in the drawing.

In one preferred embodiment shown in FIG. 1, the present invention concerns a process for the mitigation and control of air pollution caused by the emissions of sulfur dioxide. Effluent vent, flue or exhaust gas containing sulfur dioxide is scrubbed with an aqueous sulfuric acid stream in column 10 comprising a confined scrubbing zone. Thereby the sulfur dioxide is solubilized in the acid and removed from the gas stream. Simultaneously the dissolved sulfur dioxide is subjected to electrolysis. The confined scrubbing zone contains a bed of particulate packing material 20a that is electrically conductive. This packing material both provides the gas-liquid contact surface for scrubbing and serves as the electrochemically active surface of a bipolar electrode for the electrolysis reactions.

The confined scrubbing zone also contains two electrical contacts which are arranged so that the packing material is spaced between the contacts and is in electrical contact with them. The electrical contacts 32 and 34 are shown as being located one at the top and the other at the bottom of the column packing material. This is not the only possible configuration for the contacts. For example, the inner wall of the scrubbing column could be manufactured from an electrically conductive material so as to serve as one contact. The other contact would consist of an electrically conductive cylinder that is located along the vertical axis of the column.

In this latter arrangement, the packing material fills the annular space so provided.

A circulating pump 40 supplies the aqueous acid stream to the scrubbing zone in order to provide effective contact between the gas stream and the liquid phase. The quantity of acid which is circulated by the pump needs to be sufficient only to wet the packing material effectively. The concentration of the aqueous acid stream is maintained within set limits by means of makeup water or acid, which is fed to the system. Byproduct acid produced by the process is withdrawn as indicated in FIG. 1. The gas flow is shown as concurrent with the aqueous acid stream in the column. This arrangement has the advantage over countercurrent flow of reducing the pressure drop across the column.

A unique feature of the present invention is the use of a pulsed current as opposed to an unpulsed direct current to achieve electrolysis. Means are provided to adjust and regulate the pulsed current supplied through the electrical contacts to the electrically conductive packing material. The electrical power supply 50, an integral part of the process design, is shown schematically in FIG. 1. The electrical power must be properly modulated with respect to the waveform, frequency, and applied voltage. Solid state devices including microprocessors are available which can be used effectively to achieve this end.

Electrolysis is an effective and efficient way to convert sulfurous acid to sulfuric acid when sulfurous acid is formed by stripping sulfur dioxide from waste gases that contain relatively low concentrations of sulfur dioxide. Still, certain rate limiting steps in the process prevent the realization of the full advantages of this method. The theoretical potential required for this reaction is 0.2 volts, but because of electrode polarization the applied voltage for a unit cell must be increased to about 0.6 volts before significant reaction takes place.

The electrolysis of sulfurous acid is illustrated by the following equations. At the anode the reaction is:

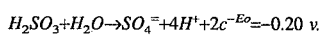

and at the cathode:

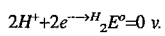

The net reaction therefore is:

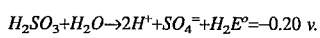

Instead of using a separate anode and cathode for electrolysis, the present invention makes use of a bipolar electrode in the form of column packing material which is electrically conductive. Such an electrode is comprised of a bed of solid particles or shapes which forms a medium of moderate electrical conductivity. This bed or packing also serves as the gas-liquid contact surface for absorption.

When an electric current is passed through the column packing, oppositely charged sites are formed on the surface of the particles. The desired electrochemical reaction takes place at these charged sites. Depending on the dimensions of the column, the packing will be the equivalent of a number of electrolytic cells connected in series. Thus, the applied voltage to the column will equal the voltage required for one cell times the number of cell equivalents in the column.

An analysis of the process reveals some aspects of its operation. To begin with, the overall process can be broken down into a number of steps: 1. Sulfur dioxide is absorbed from the gas stream by the aqueous acid stream. 2. Ions formed in solution diffuse to the charged sites on the packing. 3. At these active sites, ions are transferred to the electrode surface. 4. Oxidation and reduction reactions occur when the ions release or take on electrons. 5. The products of the reactions diffuse or escape from the electrode surfaces.

Under ideal conditions each of these above steps will proceed sufficiently fast so that no single step is rate limiting. In reality, however, one or more steps have been observed to retard the overall process, thus causing inefficiencies. The sum of these effects has been referred to as polarization. In general, polarization is of two types: that ascribed to concentration gradients and that due to overvoltage. The latter is believed to be the result of the delay in transferring ions to the electrode surface, identified as step 3 above.

The challenge, therefore, is to improve process efficiencies in order to minimize the effects of polarization. It has been observed in laboratory experiments with cells wherein the electrolyte is vigorously stirred that as soon as the circuit is broken, the back emf which causes the overvoltage rapidly falls to zero. This result provides a clue to the solution of the problem. If instead of using a direct current, pulses of electricity are applied to the cell, relaxation effects will reduce or minimize the observed overvoltage. The acid film which wets the packing material is continually subjected to perturbations, and therefore the bipolar cell approximates the conditions of agitation experienced with the stirred cell.

The waveform and frequency of the applied pulsed current are open to debate. Extensive work has been done and published concerning square waves whereby the voltage remains constant until the power is cut off or reversed. In the present invention, however, a sinusoidal alternating current appears to be equally effective. The characteristics of a bipolar electrode are such that a multiplicity of sites is available for activation by an alternating current.

Current frequency is dependent upon reaction kinetics and to a certain extent on the nature of the column packing material. At low frequencies one would not expect to notice a difference. Because of symmetry, the bipolar electrode cannot recognize a change in polarity. As the frequency is increased however, the overvoltage is gradually reduced. These reductions become more pronounced until a point is reached when further increases in frequency have little or no effect. The limiting condition, of course, is the theoretical potential.

Figure 2:
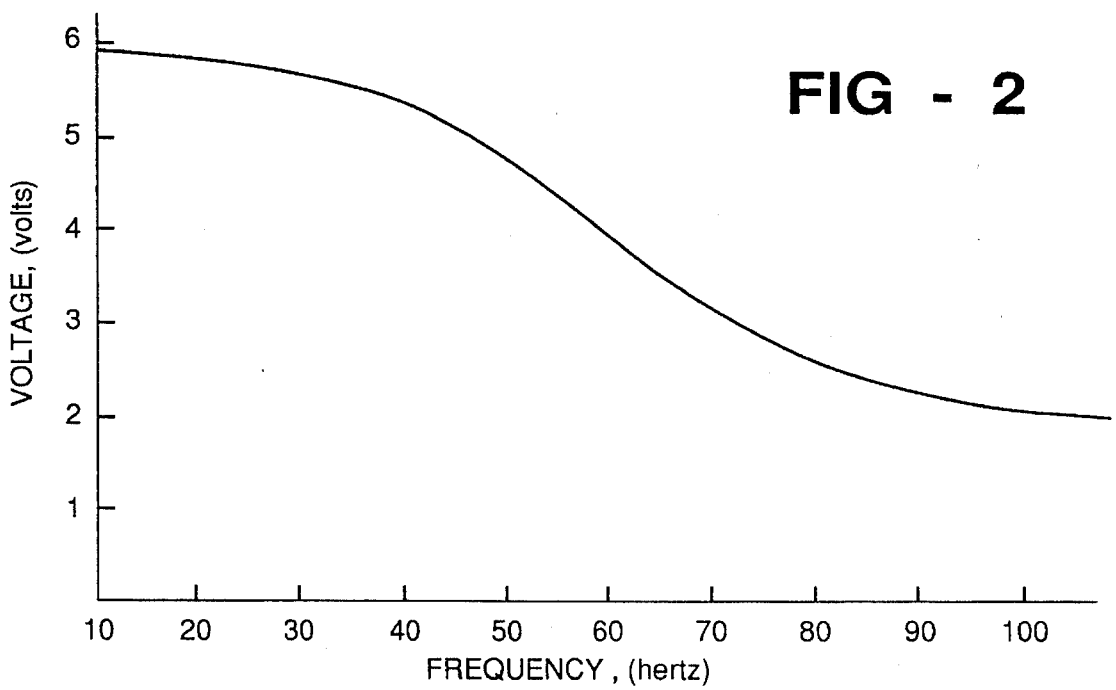
FIG. 2 is a graph indicating the characteristics of a pulsed current. It shows the required voltage for a cell equivalent as a function of the frequency of the current.

The effect of frequency on voltage, therefore, can be described by a sigmoidal function which is a continuous S-shaped curve that asymptotically approaches fixed values at both extremes of frequency. In mathematical terms, the voltage can be given as a function of frequency by the following empirical equation:

$$V = \frac{4}{1 + e^{a(f+b)}} + 2$$

where V is tile applied voltage for a cell equivalent, f is the frequency of the pulsed current, e is the base of the natural logarithm, a is a scaling coefficient, and b is a threshold constant. The constants 4 and 2 reflect the fact that the theoretical potential is 2 v. and the overvoltage for a direct current is 4 v. If a is taken as 1/12 and b is set at −60, a curve as shown in FIG. 2 is obtained. The inflection point for this particular case is located at a frequency of 60 hertz. This is the common frequency of power grids. A significant effect of frequency on voltage is shown by the curve in the range of 12 hertz to 108 hertz.

Electrode materials have been found to have a strong effect on overvoltage. Platinized platinum electrodes, for example, exhibit no hydrogen overvoltage at zero current density. By comparison, other metal surfaces produce significant overvoltage, but there is considerable variation between individual metals. Because of economic considerations, the selection of electrode materials is not nearly so easy as using data on overvoltage as a guide.

A number of factors must be taken into account in selecting the electrode material. Besides cost, the corrosive nature of the aqueous acid stream must be reckoned with. This acid stream with a temperature between room temperature and its boiling point may range in concentration anywhere from about 5 weight percent to over 93 weight percent sulfuric acid. Moreover it may contain such impurities as nitric acid and chloride ions. Therefore, the minimum requirement in selecting an electrode material is that it be able to stand up to such environments. Tantalum as well as various commercially available nickel based alloys have been shown to do a good job in meeting these conditions.

An important consideration other than corrosion resistance is the electrical properties of the packing material. Using a material that is too good a conductor will essentially result in a short circuit. On the other hand, a very poor conductor may render the process inoperable. Several materials have been proposed for this application (i.e., for fabrication of conductive material) including graphite and Duriron, a ferro silicon alloy. Another possible material is Hastelloy D, a nickel silicon alloy, known for its inertness in all concentrations of sulfuric acid to the boiling point. Still another candidate is zirconium diboride. This ceramic has good oxidation and corrosion resistance and also is used in electrical contacts. Its electrical resistivity is reported to be $9.2 \times 10^{-6}$ ohm-cm at 20° C.

Since economics play such an important part in pollution abatement, the present invention has decided advantages over competing processes. By reducing the cost of power, minimizing the investment in electrical gear, and increasing the capacity per unit volume of packing material, the present invention promises to enhance the attractiveness of the bipolar process for the mitigation of air pollution caused by the discharge of sulfur dioxide.

The embodiment of the invention in which exclusive property or privilege is claimed are defined as follows:

What is claimed is:

1. A process for the mitigation and control of air pollution caused by the emission of sulfur dioxide in effluent vent, flue or exhaust gas, said process comprising the removal of sulfur dioxide from a stream of such gas by scrubbing the gas in a column with aqueous sulfuric acid to solubilize and remove sulfur dioxide from the gas, said column containing electrically conductive packing material which serves both as a gas-liquid contact surface for scrubbing and as the electrochemically active surface of a bipolar electrode, and two electrical contacts arranged so that the bed of packing material is spaced between the contacts and is in electrical contact with said contacts;

applying a pulsed electrical potential across said two contacts in excess of about 0.2 volts in order to effect electrolysis; and maintaining the concentration of the aqueous sulfuric acid by means of make-up water or acid.

2. A process according to claim 1 wherein the pulsed electrical potential has a frequency in the range of 12 hertz to 108 hertz.

3. A process according to claim 1 wherein the electrically conductive packing material is fabricated from nickel silicon alloy.

4. A process according to claim 1 wherein the electrically conductive packing material is fabricated from zirconium diboride.

5. A process according to claim 1 comprising the withdrawal of byproduct aqueous sulfuric acid from the acid stream.

* * * * *